United States Patent
Zhang et al.

(10) Patent No.: US 12,514,346 B2
(45) Date of Patent: Jan. 6, 2026

(54) GEM APPLIER AND METHOD

(71) Applicant: Hally Hair, Inc., New Canaan, CT (US)

(72) Inventors: Jian Feng Zhang, Shanghai (CN); Zheng Wang, Shanghai (CN)

(73) Assignee: Hally Hair, Inc, New Canaan, CT (US)

( * ) Notice: Subject to any disclaimer, the term of this patent is extended or adjusted under 35 U.S.C. 154(b) by 90 days.

(21) Appl. No.: 18/731,497

(22) Filed: Jun. 3, 2024

(65) Prior Publication Data
US 2025/0366578 A1    Dec. 4, 2025

(51) Int. Cl.
| | | |
|---|---|---|
| B29C 65/00 | (2006.01) | |
| A44C 17/04 | (2006.01) | |
| B44B 9/00 | (2006.01) | |
| B29C 65/48 | (2006.01) | |
| B29C 65/56 | (2006.01) | |
| B29C 65/78 | (2006.01) | |

(52) U.S. Cl.
CPC ............... *A44C 17/04* (2013.01); *B44B 9/00* (2013.01); *A44C 17/043* (2013.01); *B29C 65/48* (2013.01); *B29C 65/565* (2013.01); *B29C 65/568* (2013.01); *B29C 65/7802* (2013.01)

(58) Field of Classification Search
CPC ..... B29C 65/48; B29C 65/565; B29C 65/568; B29C 65/7802; A44C 14/04; A44C 14/043
See application file for complete search history.

(56) References Cited

U.S. PATENT DOCUMENTS

| | | |
|---|---|---|
| 3,854,625 A | 12/1974 | Kuebler |
| 4,323,611 A | 4/1982 | Poll |
| 4,842,673 A | 6/1989 | Kurihara |
| 5,252,377 A | 10/1993 | Poll |
| 10,226,111 B2 | 3/2019 | Cella et al. |
| 10,464,367 B1 | 11/2019 | Cella et al. |
| 2008/0011773 A1 | 1/2008 | Tobias |
| 2008/0017323 A1 | 1/2008 | Peterson |
| 2009/0020549 A1 | 1/2009 | Lyndegaard et al. |
| 2009/0107976 A1 | 4/2009 | Franken |
| 2010/0294414 A1 | 11/2010 | Faraj |
| 2013/0248116 A1 | 9/2013 | Gratzer |
| 2013/0327475 A1 | 12/2013 | Gratzer |

(Continued)

FOREIGN PATENT DOCUMENTS

| | | |
|---|---|---|
| DE | 20 2012 103 157 U1 | 11/2012 |
| GB | 2467365 A | 8/2010 |

(Continued)

OTHER PUBLICATIONS

International Search Report and Written Opinion mailed Oct. 17, 2025 for International Application No. PCT/US2025/031637.

*Primary Examiner* — Philip C Tucker
*Assistant Examiner* — Nickolas R Harm
(74) *Attorney, Agent, or Firm* — Wolf, Greenfield & Sacks, P.C.

(57) ABSTRACT

A gem applier and method for dispensing gems includes holding a plurality of gems in a stack and moving a gem from the stack for dispensing. A gem may be moved from the stack in a plane that is perpendicular to a direction in which the gem is dispensed or applied to a substrate. An actuator may cause both movement of a gem from a stack and dispensing of the gem.

20 Claims, 13 Drawing Sheets

(56) References Cited

U.S. PATENT DOCUMENTS

| | | | |
|---|---|---|---|
| 2014/0150959 A1 | 6/2014 | Gratzer | |
| 2015/0353253 A1 | 12/2015 | Gratzer | |
| 2017/0000225 A1 | 1/2017 | Cella et al. | |
| 2017/0107046 A1 | 4/2017 | Drahorád et al. | |
| 2017/0339975 A1* | 11/2017 | Williams-Blair | A61K 8/676 |
| 2019/0008241 A1 | 1/2019 | Cella et al. | |

FOREIGN PATENT DOCUMENTS

| | | |
|---|---|---|
| JP | 53080557 A2 | 7/1978 |
| NL | 1036817 C2 | 10/2010 |

* cited by examiner

GEM APPLIER AND METHOD

BACKGROUND OF INVENTION

This invention relates generally to dispensing gems or other decorative articles, e.g., gems bearing an adhesive so as to apply the gems to a substrate.

SUMMARY OF INVENTION

One or more embodiments provide a gem dispenser and/or method for dispensing gems from a stack of gems, e.g., a column-type arrangement of multiple, small decorative articles positioned one over the other. Holding such articles in a stack may provide for relatively compact storage, e.g., as compared to arrangements in which gems are held on a two-dimensional support such as an elongated strip or disc. For example, ten or more relatively small gems, e.g., decorative articles having a roughly hemispherical or disc shape with a diameter of 5 mm to 15 mm and a height of 2 mm to 10 mm, may be stored in a stacked configuration having a column or tube-type shape. One or more gems may be separated from the stack and dispensed, e.g., ejected from a body of a gem applier tool. In some cases, this configuration may allow for a relatively small size gem applier tool that can hold many more gems for dispensing than tools that hold gems in a two-dimensional format such as a strip, band or disc. This may permit a user to dispense many more gems, more quickly and/or without needing to reload an applier tool.

In some embodiments, a gem applier includes a body having a gem storage area configured to hold a stack of gems including a first gem at a bottom of the stack. The body may be shaped and/or otherwise configured to be gripped and manipulated by hand by a user to dispense gems from the body, e.g., the body may have a dispense opening at a dispense area from which one or more gems may be dispensed from the body. A shuttle may be configured to move a gem from the stack at the storage area, e.g., move the first gem from the bottom of the stack at the storage area, to the dispense area. A push rod may be configured to move the first gem at the dispense area through the dispense opening to dispense the first gem from the body. For example, the push rod may force the first gem to move through the dispense opening so the first gem is dispensed from the dispense opening. In some cases, a gem may be dispensed with a force, e.g., to force the dispensed gem into engagement with a substrate, such as fabric, skin, hair, etc. onto which the gem is to be dispensed. Gems may in some cases have an adhesive, e.g., so that a dispensed gem adheres to a surface onto which the gem is dispensed.

In some cases, the dispense area may be within the body, e.g., a first gem may be moved from a stack of gems to another area within the body that is separate from the stack and from which the first gem is moved through the dispense opening. In some embodiments, the shuttle may be rotatable relative to the body to move the first gem from the gem storage area to the dispense area. For example, the shuttle may engage with the first gem and rotate or otherwise move the first gem from the stack to the dispense area. In some cases, the shuttle may include a disc with a disc opening to receive the first gem in the stack, and the shuttle may be configured to rotate relative to the body (and the stack) about an axis that is offset from the disc opening. Thus, the first gem may be moved along an arcuate path from the stack to the dispense area.

In some cases, movement of the push rod relative to the body may cause the shuttle to rotate or otherwise move relative to the body to move a gem from the stack to the dispense area. For example, the push rod may be attached to a push rod body that is movable relative to the body between first and second positions, and movement of the push rod body from the first position to the second position may cause the shuttle to move a first gem from the stack to the dispense area. In some cases, movement of the push rod body from the first position to the second position may cause the push rod to move the first gem from the dispense area through the dispense opening. In some embodiments, the push rod body may include a cam follower and the shuttle may include a cam, e.g., such that movement of the push rod body from the first position to the second position causes the cam follower to move along the cam and move the shuttle relative to the body, e.g., causing the shuttle to rotate relative to the body. In some cases, the cam may include a spiral surface, e.g., so movement of the cam follower along a linear path causes the cam (and the shuttle) to move along a rotational path.

In some cases, the gem applier includes a platform attached to the body and positioned such that movement of the push rod to move the first gem from the dispense area out of the dispense opening moves the first gem toward the platform. The platform may provide a surface to support a substrate, such as a fabric, hair, etc., onto which a gem is dispensed. In some embodiments, the platform may be movable toward the body such that the platform is movable toward the dispense opening, e.g., the platform may provide a counterforce on a substrate so the push rod can apply a force to the gem to engage the gem with the substrate. In some cases, the platform is spring biased to move away from the body, e.g., so the platform moves away from the dispense opening when an application force is released by a user. In some cases, the platform may be removeable from the body, e.g., so gems can be dispensed without use of the platform.

In some embodiments, the gem applier may include an actuation button, e.g., at a top of the body, and movable relative to the body between first and second positions. The actuation button may be operably coupled to the push rod and the shuttle such that movement of the actuation button from the first position to the second position causes the shuttle to move the first gem from the storage area to the dispense area and the push rod to move the first gem at the dispense area through the dispense opening to dispense the first gem from the body. Thus, a user may cause dispensing of a gem by simply moving the actuation button on the body. In some cases, the dispense opening may be at a bottom of the body, and the actuation button may be coupled to the push rod to move the push rod downwardly relative to the body. Downward movement of the push rod may cause the shuttle to rotate relative to the body to move the first gem from the storage area to the dispense area.

In some cases, an actuation button may be removable from the body, e.g., to expose the gem storage area for placement of the stack of gems in the gem storage area. Thus, once a stack of gems is dispensed from the applier, a new replacement stack of gems may be provided to the gem storage area. In some cases, a gem storage area cover may be configured to cover the gem storage area and/or to bias the stack of gems downwardly relative to the body, e.g., so a first gem at a bottom of the stack is moved to an area where the shuttle can engage and move the first gem to the dispense area.

In some embodiments, a gem dispenser may include a body including a gem storage area configured to hold a stack of gems including first gem at a bottom of the stack, and a dispense opening at a dispense area at a bottom of the body. A shuttle may be configured to rotate relative to the body about a vertical axis to move the first gem from the storage area to the dispense area, and a push rod body may be movable along a vertical direction relative to the body. The push rod body may include a push rod configured to move the first gem at the dispense area through the dispense opening to dispense the first gem from the body. An actuation button may be mounted at a top of the body and movable along the vertical direction relative to the body. The actuation body may be coupled to the push rod body such that movement of the actuation button downwardly relative to the body moves the push rod body downwardly relative to the body, e.g., such that downward movement of the push rod body relative to the body causes the shuttle to rotate to move the first gem from the storage area to the dispense area and causes the push rod to move the first gem through the dispense opening.

In some cases, a method for dispensing gems may include holding a stack of gems in a body, with the stack of gems including a first gem at a bottom of the stack. The body may be a part of a gem applier, e.g., that is hand holdable by a user and operable to dispense gems from the stack. The first gem may be moved along an arcuate pathway (or a linear or other suitable pathway) to separate the first gem from the stack of gems and position the first gem at a dispensing area. For example, the first gem may be moved by a rotating shuttle or other structure to separate the first gem from the stack. The first gem at the dispensing area may be pushed through a dispense opening of the body to dispense the first gem from the body, e.g., a push rod may contact the first gem and force the first gem to exit through an opening of the body.

Various exemplary embodiments of the device are further depicted and described below.

BRIEF DESCRIPTION OF THE DRAWINGS

Aspects of the invention are described with reference to various embodiments, and to the figures, which include.

DETAILED DESCRIPTION

Inventive features are described below with reference to illustrative embodiments, but it should be understood that inventive features are not to be construed narrowly in view of the specific embodiments described. Thus, aspects of the invention are not limited to the embodiments described herein. It should also be understood that various inventive features may be used alone and/or in any suitable combination with each other, and thus various embodiments should not be interpreted as requiring any particular combination or combinations of features. Instead, one or more features of the embodiments described May be combined with any other suitable features of other embodiments. For example, one embodiment includes a platform that is movable and/or removable from the gem applier body, and another embodiment includes a shuttle that moves rotationally to move a gem from a stack to a dispense area. These features may be used together as in the embodiments below, or independently of each other.

Figure 1:
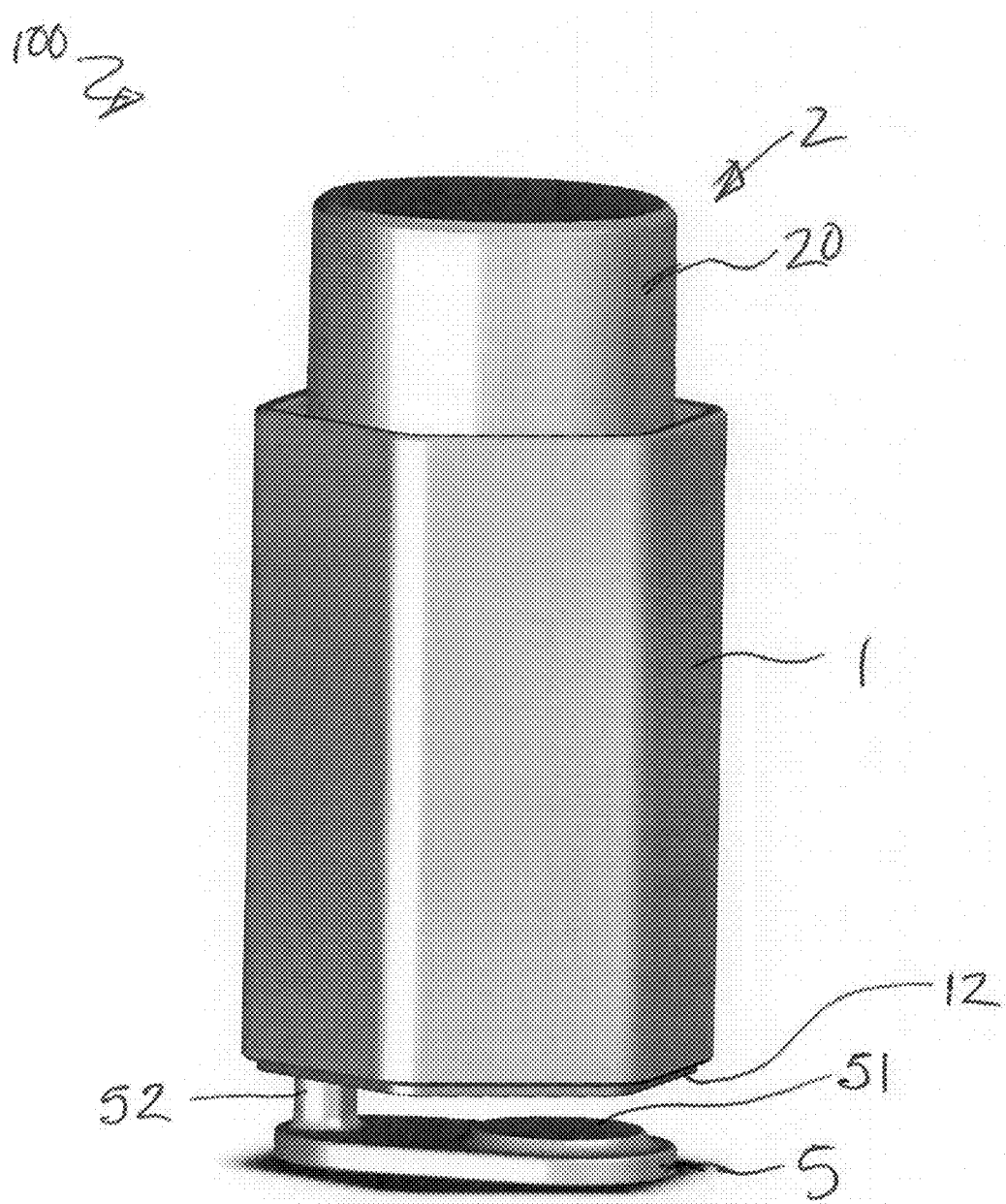
FIG. 1 shows an upper perspective view of a gem applier in an illustrative embodiment.
Figure 2:
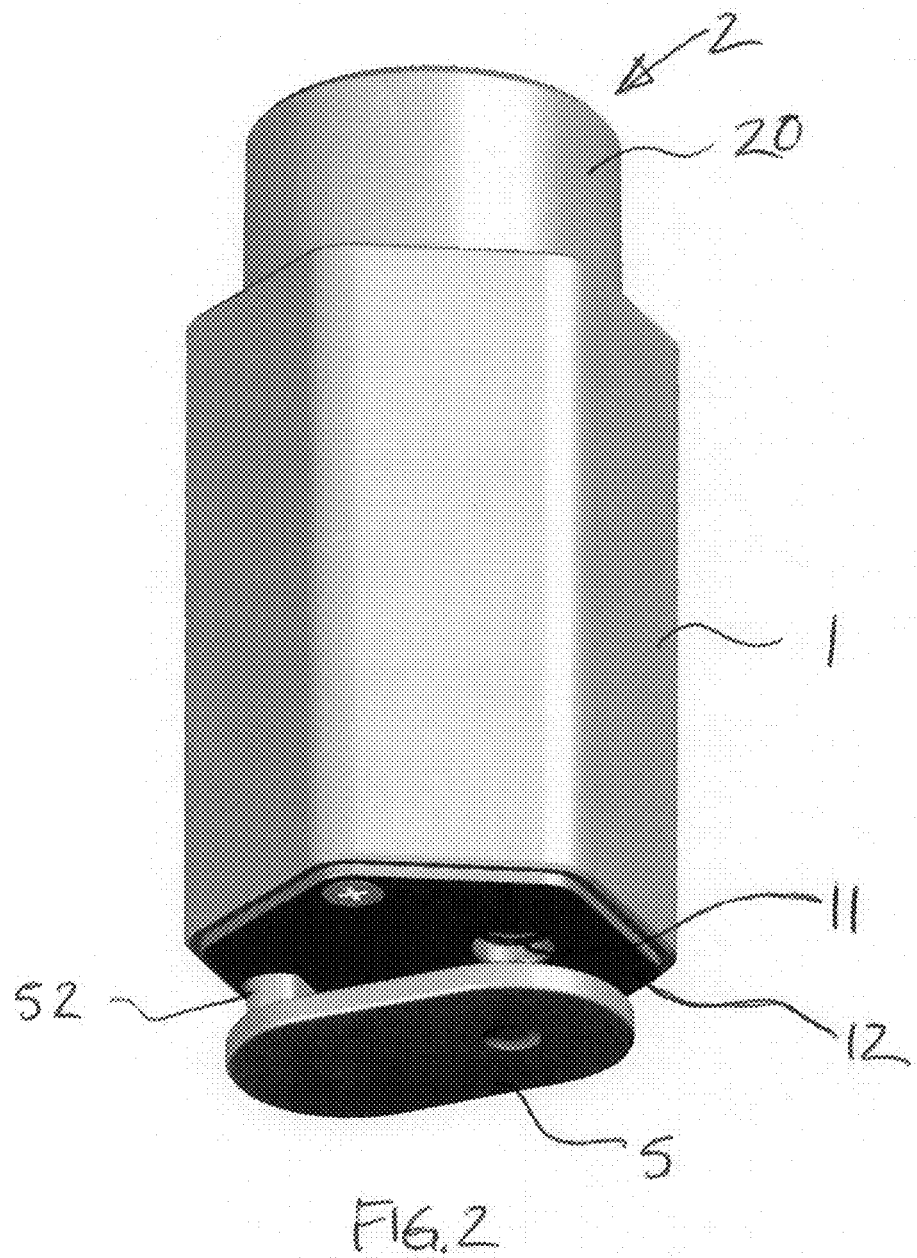
FIG. 2 shows a lower perspective view of the FIG. 1 gem applier.

In some aspects, a gem applier can be used to apply or otherwise dispense gems as desired by a user. For example, FIGS. 1 and 2 show perspective views of a gem applier 100 that can be used to dispense gems onto a surface or other article, such as fabric, skin, hair, etc. The gems can be decorative articles, e.g., a rhinestone or other similar element, or any other item to be dispensed. The gems can include an adhesive portion, e.g., on a bottom surface, so that the dispensed gem can be adhered to a surface. In some cases, the adhesive can be a pressure sensitive adhesive, e.g., such that a gem adheres to the surface by pressing the gem against a surface. In some embodiments, a gem applier may provide a force on the gem to press the gem against a surface, although in some embodiments the gem applier may simply dispense a gem without providing an application force on the gem. In some cases, an adhesive on the gem can require activation of some type, such as heat, pressure, water or other fluid, or other component needed to cause the adhesive to become tacky or otherwise adhere the gem to a surface. The adhesive may be activated prior to dispensing of the gem, or after, e.g., by applying heat to a previously dispensed gem.

In some embodiments, a gem applier 100 includes a body 1, e.g., that can be grasped and manipulated by a user wishing to dispense a gem. An actuator 2, such as a button, trigger or other movable component, may be attached to and movable relative to the body 1 to cause gems to be dispensed from the body 1. For example, in FIGS. 1 and 2 the actuator 2 includes a cap 20 that a user may grasp and/or press on to cause dispensing of a gem. In some cases, the actuator 2 may be located at an upper side of the body 1, e.g., so a user can press downwardly on the actuator 2 to move the actuator 2 downwardly relative to the body 1 and cause a gem to be dispensed. However, an actuator 2 may be configured in other ways, such as including a trigger, handle or other movable element that can be moved by a user to cause dispensing of a gem. For example, the actuator in FIGS. 1 and 2 could be moved by a handle and trigger arrangement such that the actuator 2 moves relative to the body 1 in response to a user squeezing the handle and trigger together. In some embodiments an actuator 2 may be motor operated, e.g., the actuator 2 may move in response to a user pressing a button that causes a drive motor to operate and move the actuator 2 relative to the body 1. In some embodiments, an actuator 2 may include two or more components that can be operated separately by a user, e.g., one component to more a gem from a stack and another component to cause the gem to be dispensed from the body.

Gems may be dispensed from the body 1 at any suitable location or locations. In some embodiments, gems may be dispensed from a dispense opening 11, e.g., at a bottom side of the body 1. The dispensing opening 11 may be formed in a base 12 of the body 1, e.g., the base 12 may be positioned on a surface on which a gem is to be dispensed and support the body 1 so the actuator 2 can be pressed downwardly to cause a gem to be dispensed form the opening 11. Gems may be dispensed one gem at a time from the dispense opening 11, e.g., one gem for each downward or other movement of the actuator 2 relative to the body 1, although in some embodiments, two or more gems may be dispensed per actuation.

In some cases, a gem applier 100 may include a platform 5 on which a substrate to receive a gem may be placed. For example, a piece of fabric may be positioned between an application area 51 of the platform 5 and the dispensing opening 11 so that a gem can be dispensed onto the fabric. The platform 5 may provide a counterforce to a dispensing force placed on a gem, e.g., a gem may be pushed out of the dispensing opening 11 in a downward direction toward the platform 5, and the platform 5 may provide support to a substrate on the application area 51 so that suitable application force between the gem and the substrate can be provided, e.g., to adhere the gem to the substrate. In some cases, a user may support the platform 5, e.g., by providing a force that tends to cause the platform 5 and the actuator 2 to move toward each other, or that tends to cause the platform 5 to move toward the body 1. In some cases, the platform 5 may be placed on a support surface, such as a table top, and a user may press downwardly on the actuator 2 (e.g., to dispense a gem) and/or the body 1 to urge the base 12 to move toward the platform 5 (e.g., to clamp or squeeze a substrate between the platform 5 and the base 12 before and/or during gem dispensing). In some cases, the platform 5 may be moveable relative to the body 1, e.g., a leg 52 may be received into an opening of the base 12 so that the platform 5 is movable toward and away from the base 12. In some embodiments, a spring bias may be provided that urges the platform 5 to move away from the base 12, and the spring bias can be overcome by a user, e.g., by pressing the body 1 and/or actuator 2 toward the platform 5 so that the platform 5 moves toward the base 12. In some cases, the platform 5 may be removable from the body 1, e.g., by pulling the leg 52 from a receiving opening of the base 12. This may be useful, for example, if a user wishes to dispense gems onto a surface that cannot be positioned between the platform 5 and the base 12 (such as a wall or body part that is too large to fit in a gap between the platform 5 and base 12). Thereafter, the platform 5 may be re-engaged with the body 1 for applying gems to a substrate positioned between the body 1 and the platform 5.

Figure 3:
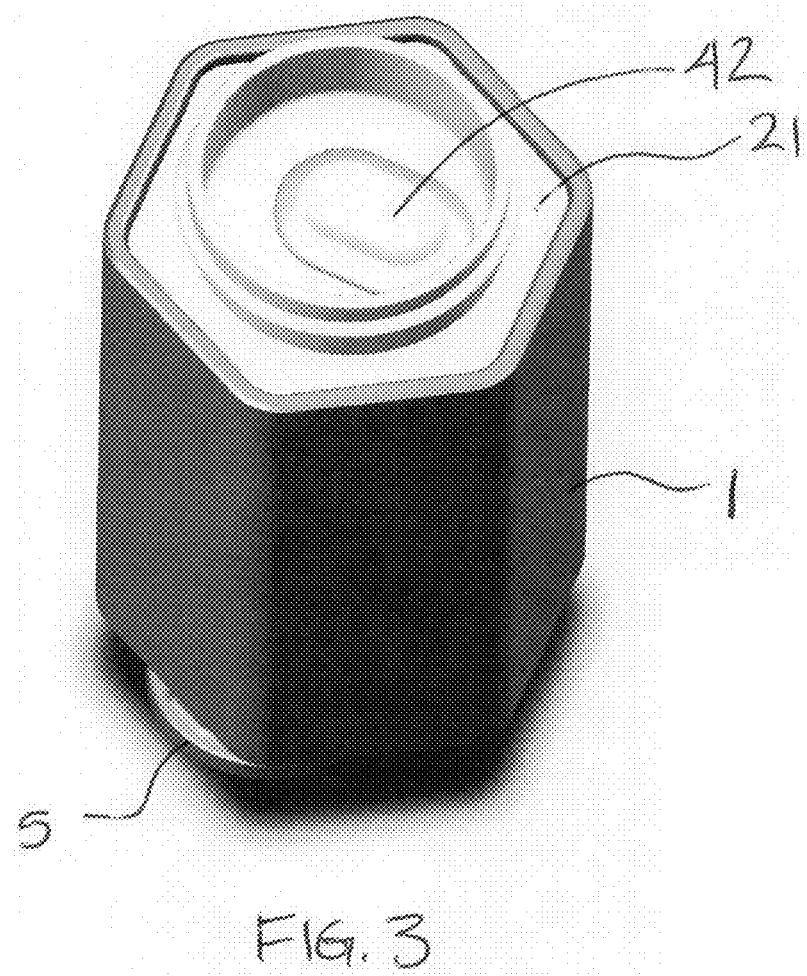
FIG. 3 shows an upper perspective view of the FIG. 1 gem applier with a cap removed.
Figure 4:
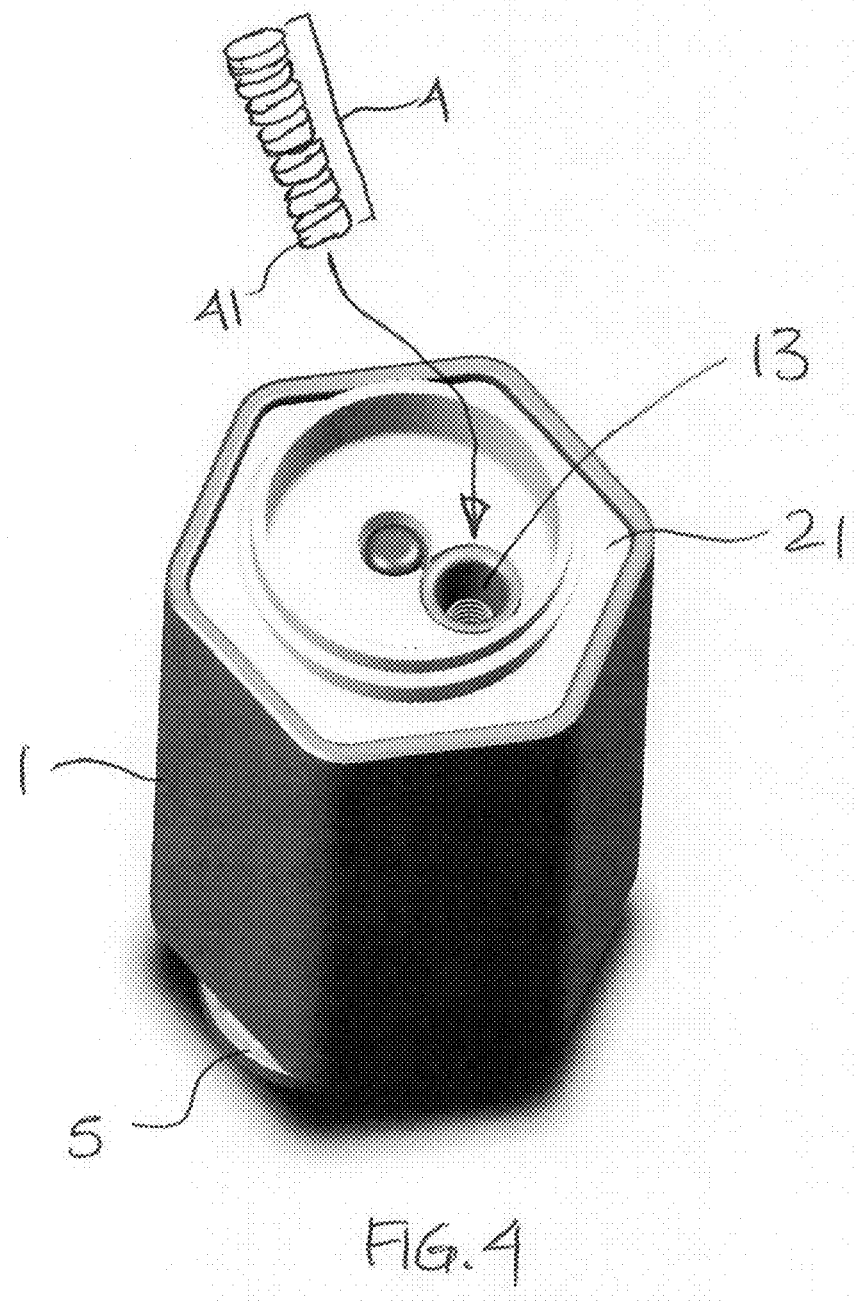
FIG. 4 shows an upper perspective view of the FIG. 1 gem applier with the cap and gem storage area cover removed.

In some embodiments, a gem applier 100 may be a single use item, e.g., the applier 100 may include one or more gems that can be dispensed and when the gem supply is exhausted, the applier 100 may no longer be usable. In some cases, the gem applier 100 may be configured to permit a gem supply to be replenished, either before or after a gem supply is exhausted. For example, FIG. 3 shows a top view of the applier 100 with the cap 20 removed so as to expose a gem storage area. The cap 20 may be removably engaged with another portion of the actuator 2, such as an actuator guide 21 that guides movement of the actuator 2 relative to the body 1 and defines an opening to the gem storage area. Although not required, a gem storage area cover 42 may cover a gem storage area and may be removable as shown in FIG. 4 to expose the gem storage area 13. With the gem storage area 13 exposed, a stack of gems 4, e.g., including one or more gems 41, may be provided into the gem storage area 13. Gems 41 may be provided into the gem storage area 13, e.g., one gem at a time, or loaded in groups of two or more. In some cases, adhesive between adjacent gems in a stack 4 may hold the stack 4 of gems 41 together, e.g., to allow for easier bulk loading of the gems into the gem storage area 13. In some cases, a stack of gems 4 may be provided in a tube or other holder that holds the gems in a stack formation, e.g., adhesive between gems need not be provided to hold the gems in a stack arrangement. The tube or other holder (e.g., which may have a straw-like configuration) may be mated with the gem storage area 13 and the stack of gems 4 dropped or otherwise provided into the gem storage area 13 in a bulk fashion. This may permit easier loading of gems into the applier 100. In some cases, the tube or other holder may be placed into the gem storage area 13 with the gems, e.g., the stack of gems and tube may be placed into the gem storage area 13 and the tube or other holder removed when the stack of gems is exhausted and before a next stack of gems is placed into the gem storage area 13. With one or more gems provided in the gem storage area 13, the cover 42 (if provided) may be positioned to cover the gem storage area 13 and the cap 20 replaced for use of the applier 100. Alternately, the cap 20 or other part of the actuator 2 may function to cover the gem storage area 13 without need for a cover 42. Note that the cap 20 in FIGS. 3 and 4 engages with the actuator guide 21 by a threaded connection, but other arrangements are possible such as an interference fit, bayonet connection, snap fit, etc. In some cases, a cap 20 need not be provided, e.g., a gem storage area cover 42 only may be provided and a user may press on an actuator guide 21 or other actuator 2 component to dispense gems.

In some embodiments, a stack of gems may be held in a body and a first gem may be located at a bottom of the stack. For example, when gems are loaded into the gem storage area 13, a first gem placed in the storage area 13 may be located at the bottom of the stack of gems 4 in the applier 100 and other gems may be added to the storage area 13 and positioned over the first gem. To dispense the first gem, the first gem may be moved relative to the stack of gems, e.g., along an arcuate or other pathway, to separate the first gem from the stack of gems and position the first gem at a dispensing area. Movement of the first gem from the stack of gems to the dispensing area may be in a plane that is perpendicular or otherwise transverse to a direction in which the gem is dispensed from the body. For example, with the first gem at the dispensing area, the first gem may be pushed through a dispense opening of the body to dispense the first gem from the body. The direction in which the first gem is pushed through the dispense opening may be perpendicular or otherwise transverse to a plane or direction in which the first gem is moved from the stack of gems to the dispensing area. As an example, the first gem may be moved in a horizontal plane (e.g., along an arcuate or linear path in the horizontal plane) from the stack of gems to the dispense area, and the gem may be moved in a vertical direction from the dispense area and through the dispense opening to be dispensed from the body. This arrangement can provide a compact applier, e.g., that has a relatively small dimension in a horizontal direction, while storing a large number of gems in the stack (e.g., in a vertical direction). This is in contrast to appliers that store gems in a planar arrangement, e.g., on a strip or disc, and require a relatively large area for gem storage.

Figure 5:
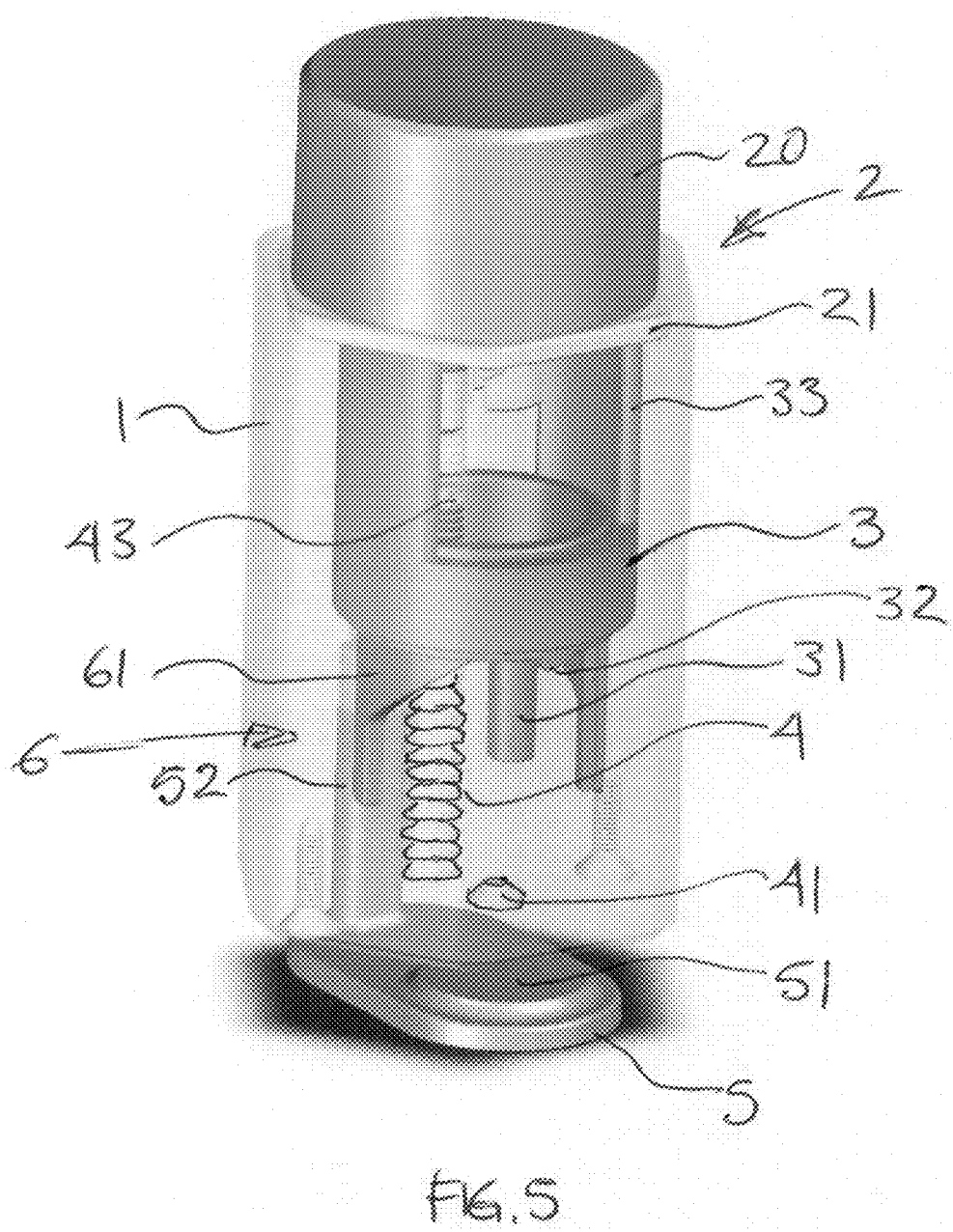
FIG. 5 shows a partial schematic view of the FIG. 1 gem applier illustrating gem movement in the gem applier.

FIG. 5 shows a partial schematic view of the gem applier 100 of FIGS. 1-4 and illustrates how an applier 100 can be configured to hold a stack of gems and move a gem from the stack in a plane that is perpendicular or otherwise transverse to a direction in which the gem is dispensed from the applier 100. In FIG. 5, the body 1 is shown in transparent form and other portions of the applier 100 are removed for clarity of description. (Components removed from FIG. 5 will be discussed in more detail below.) As can be seen in FIG. 5, a stack of gems 4 is held in a generally vertical configuration extending in a direction from a bottom of the body 1 toward a top of the body 1. Movement of the actuator 2 (e.g., the cap 20 and actuator guide 21) downwardly relative to the body 1 causes a shuttle 6 to move a first gem 41 from the stack 4 in a horizontal plane to a dispense area located generally under a push rod 31 of a push rod body 3. As is discussed more below, movement of the first gem 41 may be along an arcuate path in a horizontal plane from the bottom of the stack 4 to the dispense area under the push rod 31. With the first gem 41 at the dispense area, the push rod 31 can move downwardly to push the first gem 41 downwardly (e.g., along a vertical direction) to move the first gem 41 through the dispense opening 11 (e.g., in a direction toward the platform 5 or otherwise toward a substrate to receive the first gem 41). Although embodiments are shown in which movement of a single actuator component causes movement of a gem from the stack to a dispense area and pushing of the gem from the body, this is not required. The actuator 2 can include a first component, such as a lever or handle attached to the shuttle 6, which a user can manipulate to cause the shuttle 6 to move a gem from the stack to the dispense area. A second component of the actuator 2, a handle on a plunger or push rod, may be manipulated to cause the gem to be dispensed from the dispense opening.

Figure 6:
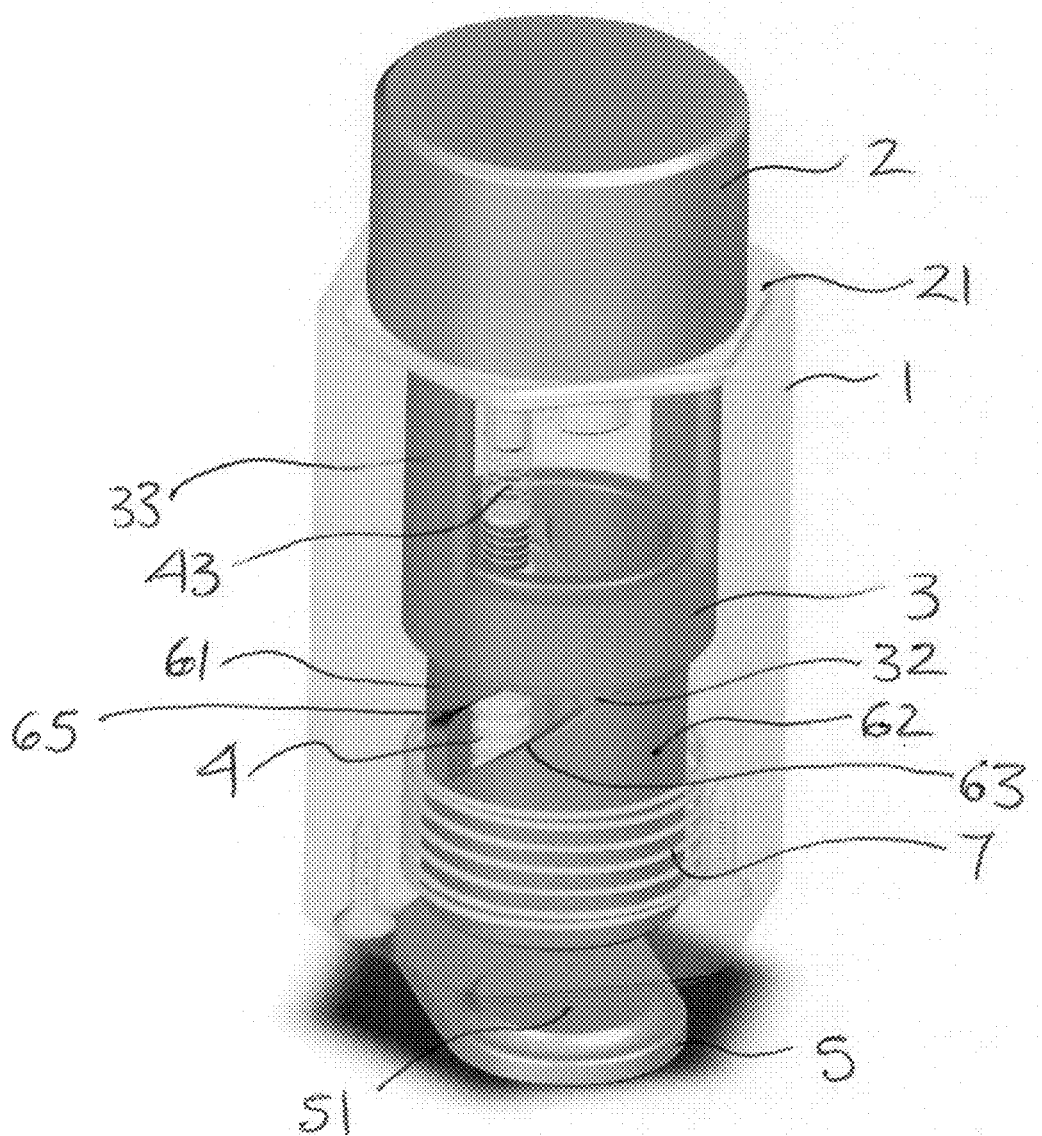
FIG. 6 shows a perspective view of the gem applier with the applier body transparent.
Figure 7:
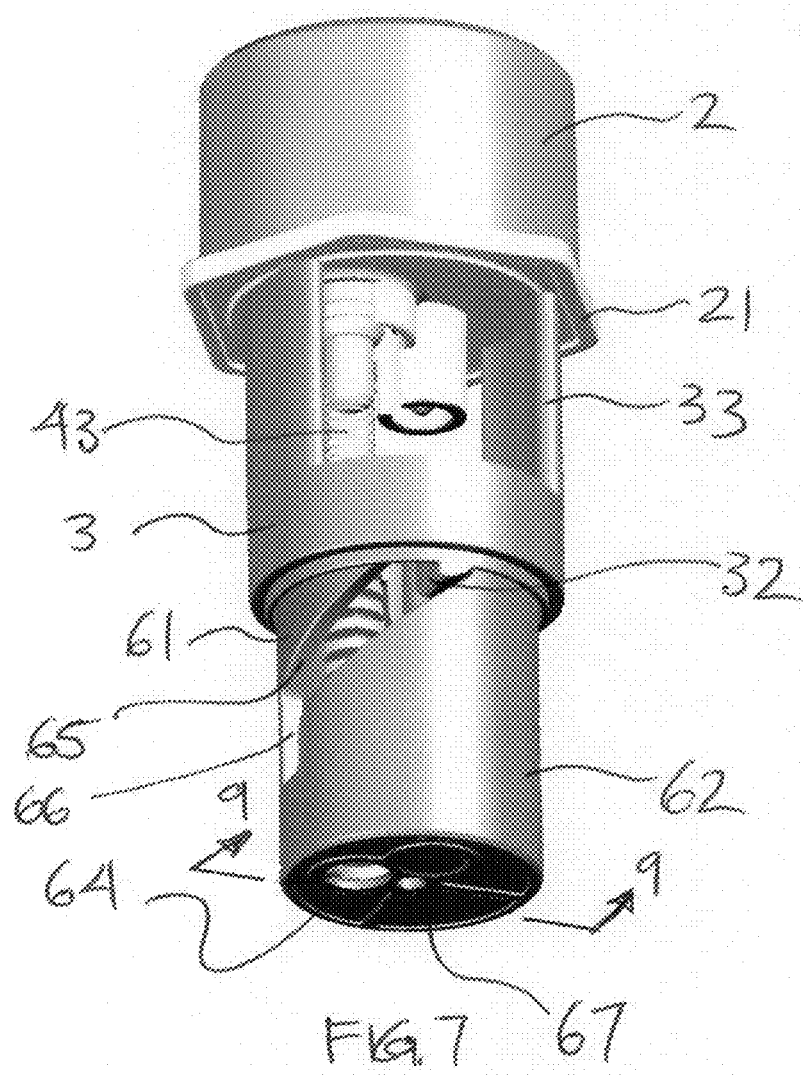
FIG. 7 shows a lower perspective view of the gem applier with the body and platform removed.

FIGS. 6 and 7 include additional components not shown in FIG. 5 and help show how a first gem 41 at the bottom of the stack 4 is moved from the stack 4 to the dispense area in some embodiments. FIG. 6 shows a view of the applier 100 similar to that in FIG. 5, but shows a lower portion 62 of the shuttle 6 which serves to move the first gem 41 from the bottom of the stack 4 to the dispense area. As can be seen in FIG. 7, the lower portion 62 of the shuttle includes a shuttle opening 64 that is initially aligned with the stack 4 and receives the first gem 41 at the bottom of the stack 4. The stack of gems 4 may be biased downwardly by a gem biasing element 43, e.g., a spring that is attached to the gem storage area cover 42 and presses down on the stack 4 when the cover 42 is in place over the storage area 13 opening. With the shuttle opening 64 aligned with the stack 4 and a bottom gem 41 received in the shuttle opening 64, the stack of gems 4 are limited in downward movement by the bottom gem 41 a portion of the base 12. That is, a portion of the base 12 contacts the first gem 41 in the shuttle opening 64 and prevents the stack 4 from moving any further downwardly. The bottom wall of the lower portion 62 that defines the shuttle opening 64 has a thickness that is approximately equal to the height of a gem 41. Thus, when the lower portion 62 rotates to position the first gem 41 at the dispense area, the lower portion 62 moves only the first gem 41 and other gems in the stack 4 remain in place.

Figure 8:
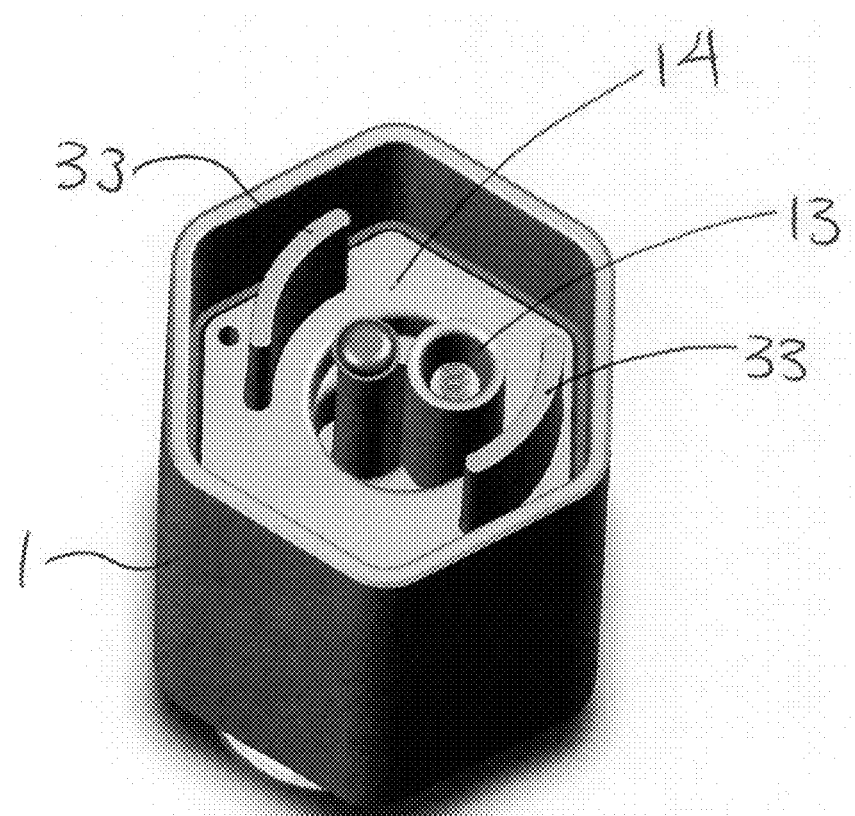
FIG. 8 shows an upper perspective view of the gem applier body with the actuator removed.

The gem dispensing operation for the gem applier 100 of FIGS. 1-7 may operate as follows. To dispense a gem, the actuator 2 (e.g., a cap 20 and actuator guide 21) may be moved downwardly relative to the body 1, e.g., by a user pressing downwardly on the actuator 2 relative to the body 1. This causes the actuator guide 21 to press downwardly on posts 33 of the push rod body 3, which moves the push rod body 3 downwardly relative to the body 1. As can be seen in FIG. 8, movement of the push rod body 3 is guided by interaction of the posts 3 with corresponding openings of a guide plate 14 of the body 1. As the push rod body 3 moves downwardly, cam followers 32 of the push rod body 3 engage with corresponding cams 63 on the lower portion 62 of the shuttle 6. The push rod body 3 cannot rotate about a vertical axis relative to the body 1 because of engagement of the posts 33 with the guide plate 14 of the body 1, but the shuttle 6 is mounted in the body 1 for rotation about the vertical axis. As the push rod body 3 moves downwardly, the cam followers 32 ride downwardly on the cams 63 and cause the shuttle 6 to rotate about the vertical axis. Since the shuttle opening 64 is offset from the rotation axis of the shuttle 6, the shuttle opening 64 and the first gem 41 at the bottom of the stack move along an arcuate path away from the stack 4 and toward the dispense area as the shuttle 6 rotates. As the push rod body 3 approaches the lower limit of its movement relative to the body 1, the shuttle opening 64 and the first gem 41 reach the dispense area. At this point, the cams 63 have a vertical portion 66 (FIG. 7) that allows the push rod body 3 and cam followers 32 to move vertically without causing further rotation of the shuttle 6. During this last phase of movement of the push rod body 3, the push rod 31 contacts the first gem 41 at the dispense area and pushes the first gem downwardly and out of the dispense opening 11.

Figure 9:
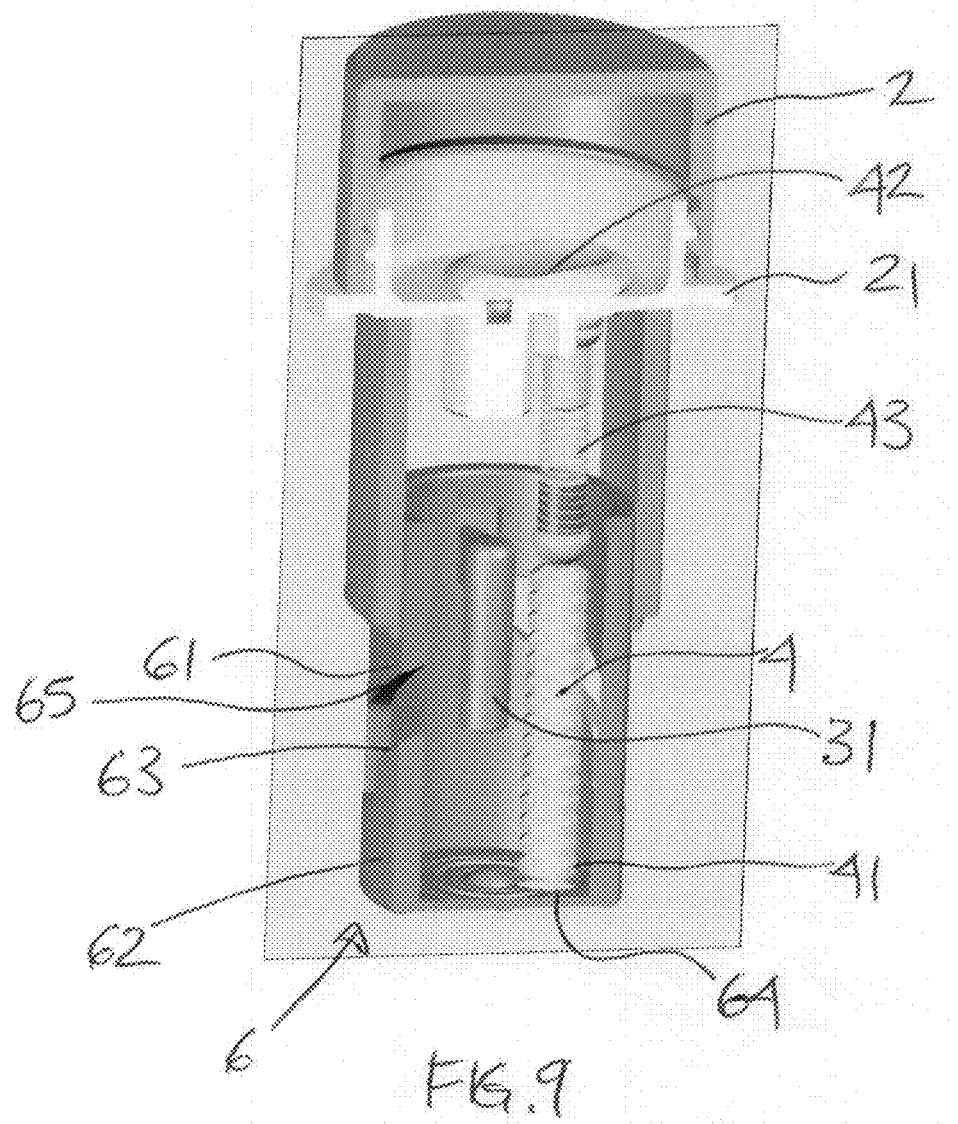
FIG. 9 shows a cross sectional view along the line 9-9 in FIG. 7.

When force on the actuator 2 is released, the push rod body 31 moves upwardly relative to the body 1 under the bias of a resilient element 7, such as a spring that urges the push rod body 3 to move upwardly and generally resists downward movement of the push rod body 3 relative to the body 1. As the push rod body 3 moves upwardly, the cam followers 32 engage with cams 65 on the upper portion 61 of the shuttle 6 and rotate the shuttle 6 so that the shuttle opening 64 returns back to the stack of gems 4 to receive a next gem at the bottom of the stack 4. As can be seen in FIG. 9, an upper part of the shuttle 6 fits within an opening of the push rod body 3, e.g., so the push rod body 3 can help guide rotational movement of the shuttle 6 relative to the push rod body 3 and the body 1. The push rod 31 extends from the push rod body 3 through a cam opening of the shuttle 6 defined by the cams 65, 63 of the upper and lower portions 61, 62 and the push rod 31 extends downwardly within a space defined by the shuttle 6. In some cases, the push rod 31 may be supported by a portion of a cam follower 32.

Figure 10:
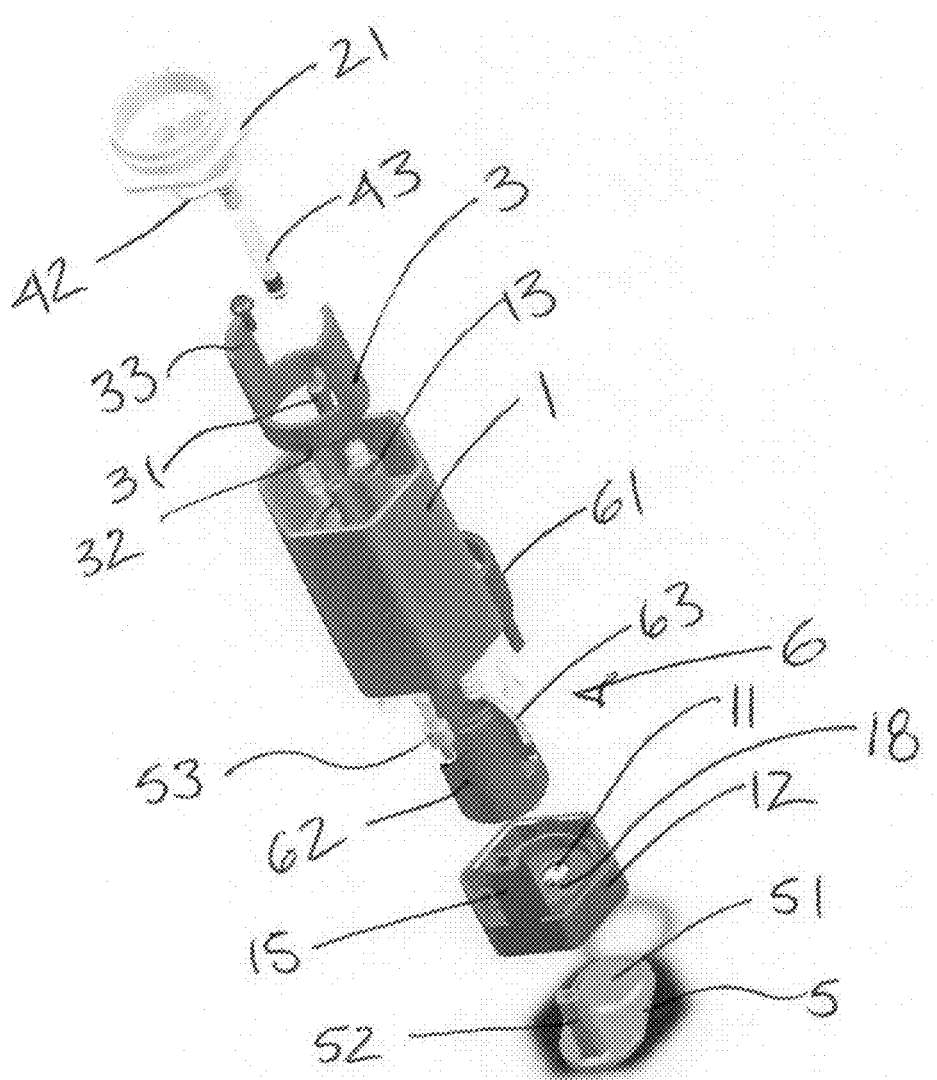
FIG. 10 shows an upper perspective exploded view of the FIG. 1 gem applier.
Figure 11:
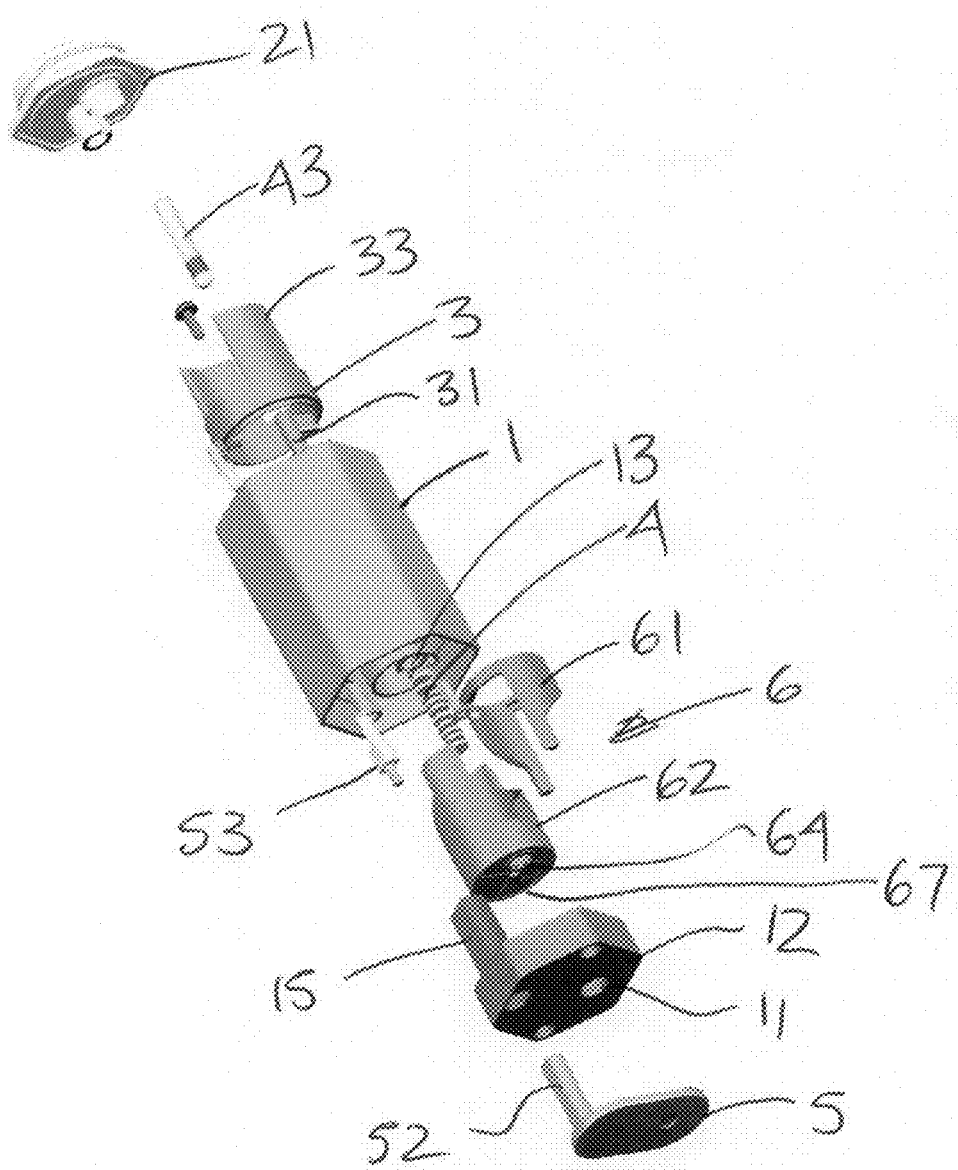
FIG. 11 shows a lower perspective exploded view of the FIG. 1 gem applier.
Figure 12:
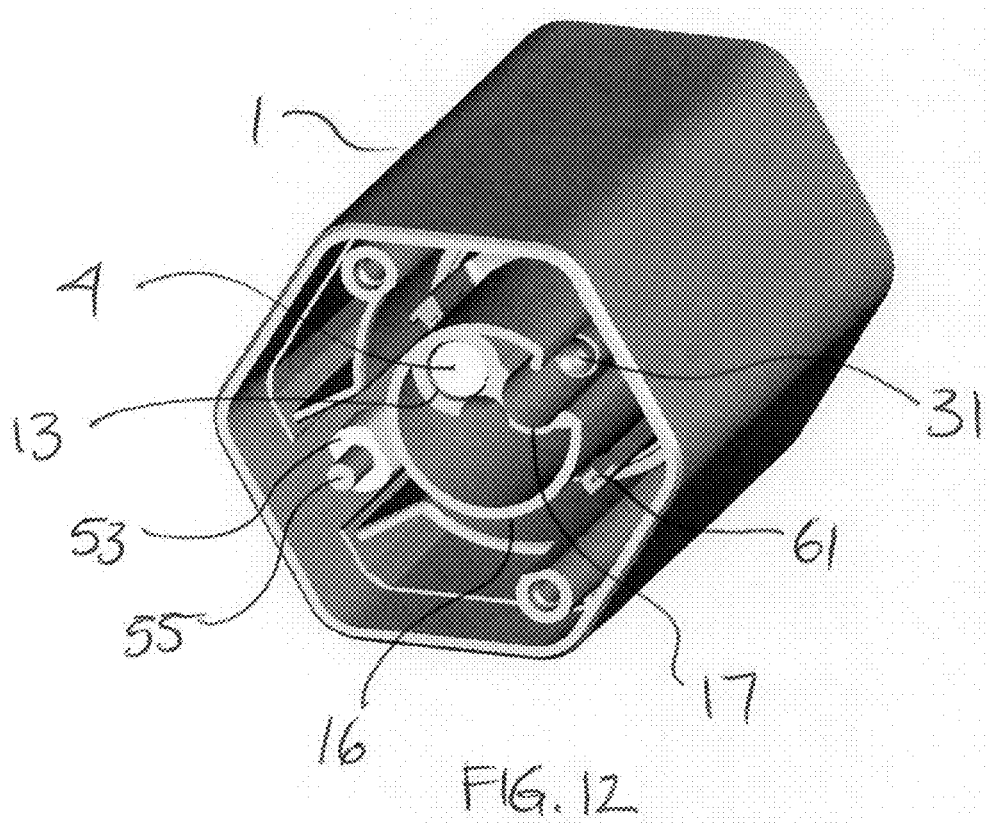
FIG. 12 shows a perspective view of a portion of the body of the FIG. 1 gem applier.

FIGS. 10 and 11 show exploded views of components of the gem applier 100 of FIGS. 1-9 and help illustrate how some components cooperate and may be fitted together. Although the push rod body 3 is shown above the body 1 in FIGS. 10 and 11, assembly of the applier 100 may require that the upper portion 61 of the shuttle 6 be inserted into a suitable cavity at a lower side of the body 1, after which the push rod body 3 may be inserted into a suitable cavity at the lower side of the body 1. The lower portion 62 of the shuttle 6 may then be inserted into the lower side of the body 1, e.g., so that the cam followers 32 and the push rod 31 are suitably captured between the cams 65, 63. For example, FIG. 12 shows a perspective view of the lower side of the body 1 with the upper portion 61 of the shuttle 6 and the push rod body 3 installed. An inner surface of the upper and lower portions 61, 62 of the shuttle 6 may contact and be guided in movement by a guide surface 16, e.g., a partial cylindrical surface, of the body 1. That is, the upper and lower portions 61, 62 of the shuttle 6 may be inserted onto the body 1 and slide over the guide surface 16. The push rod 31 may ride within a channel 17 which may help guide movement of the push rod 31, e.g., so the push rod 31 accurately contacts a gem at the dispense area for dispensing. The lower portion 62 of the shuttle 6 may also engage with the base 12 to help guide rotational movement of the shuttle 6. For example, the lower portion 62 may include a recess 67 (see FIGS. 7 and 11) that receives a pin 18 (see FIG. 10) of the base 12, e.g., so the lower portion 62 rotates about an axis that passes through the pin 18. FIG. 10 also shows that an inner surface of the bottom wall of the base 12 may be grooved or otherwise textured or arranged, e.g., so that friction between a gem 41 in the shuttle opening 64 and/or the lower portion 62 and the base 12 is reduced.

Although FIG. 12 shows the upper portion 61 and the push rod body 3 installed in the body 1 without the lower portion 62, the upper portion 61 of the shuttle 6, the push rod base 3 and the lower portion 62 of the shuttle 6 may first be assembled together as a unit, and the assembled unit inserted into a cavity at the lower side of the body 1, e.g., the assembled shuttle 6 and push rod body 3 slid over the guide surface 16 and the push rod 31 received in the channel 17 as the assembled unit is inserted into the body 1. Thus, assembly need not require separate installation of the upper portion, 61, push rod body 3 and lower portion 62 of the shuttle 6. With the push rod body 3 and shuttle 6 in place, the base 12 may be secured to the body 1, e.g., using suitable fasteners, to hold the push rod body 31 and shuttle 6 in place. Suitable openings in the body 1 for fasteners to secure the base 12 to the body 1 can be seen in FIG. 12.

Figure 13:
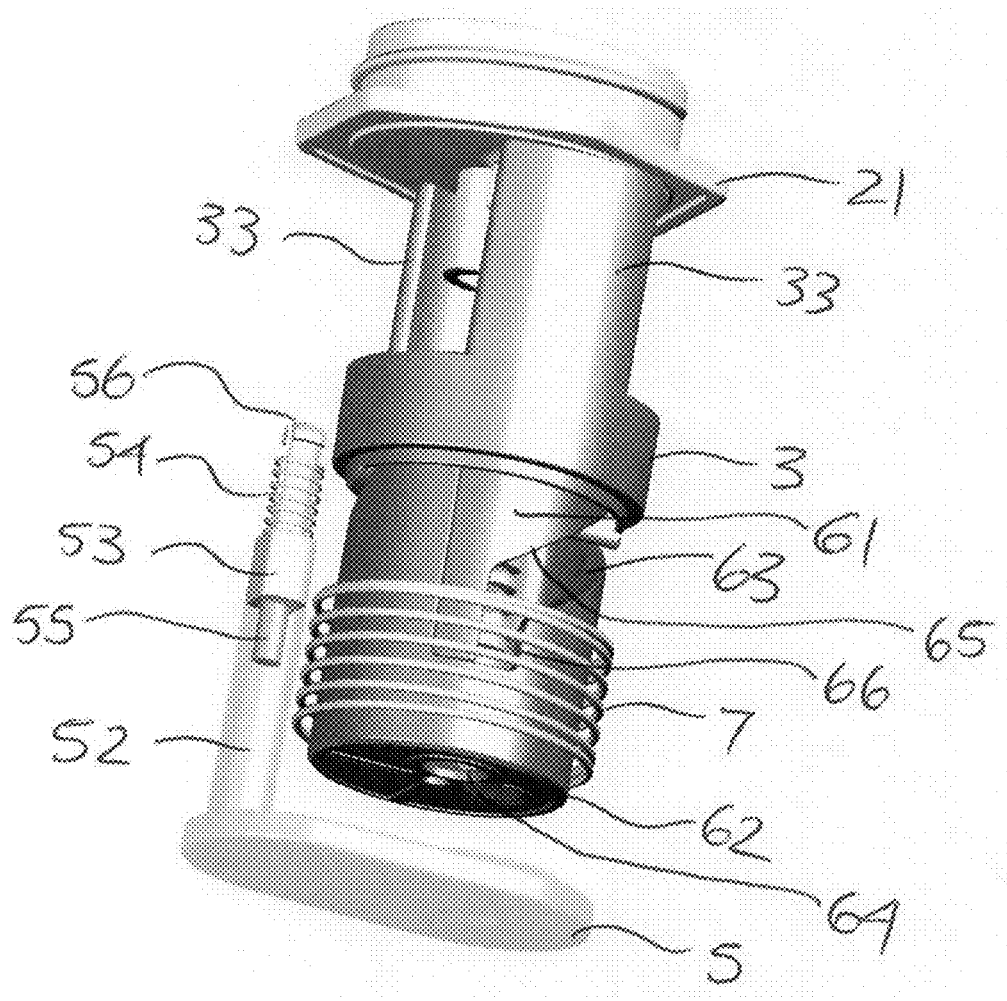
FIG. 13 shows a platform leg retainer in an illustrative embodiment along with other components of the FIG. 1 gem applier.

As noted above, the platform 5 may be removable from the body 1, e.g., by pulling the leg 52 from a receiving opening of the base 12. This may permit the gem dispenser 100 to be used without the platform 5 to dispense gems. The platform 5 may be held in place on the base 12 in any suitable way, such as by friction fit, etc. In some embodiments, a leg retainer 53 may be engaged with the base 12 and configured to removably engage with the leg 52 of the platform 5. For example, as can be seen in FIG. 13, the leg retainer 53 may include a retaining tab 56 (e.g., an expanding bayonet connection) that allows the leg retainer 53 to be inserted into the leg receiving opening of the base 12 and snaps the leg retainer 53 into engagement with the base 12. The retaining tab 56 may engage the base 12 so the leg retainer 53 is vertically movable relative to the base 12 within a range of movement, and a spring 54 may bias the leg retainer 53 to move downwardly relative to the base 12. A pin 55 may be configured to engage with a corresponding opening on an upper end of the leg 52, e.g., so the leg 52 can be removably engaged with the leg retainer 53 by friction fit. The leg retainer 53 may permit the leg 52 and platform 5 to be moved upwardly relative to the base 12, e.g., against the bias of the spring 54. The spring 54 may urge the platform 5 to move downwardly relative to the base 12, e.g., to define a desired gap between the application area 51 of the platform 5 and the base 12.

While aspects of the invention have been shown and described with reference to illustrative embodiments, it will be understood by those skilled in the art that various changes in form and details may be made therein without departing from the scope of the invention encompassed by the appended claims.

The invention claimed is:

1. A gem dispenser comprising:
a body including a gem storage area configured to hold a stack of gems including first gem at a bottom of the stack, the body having a dispense opening at a dispense area;
a shuttle configured to move the first gem from the storage area to the dispense area; and
a push rod configured to move the first gem at the dispense area through the dispense opening to dispense the first gem from the body.

2. The gem dispenser of claim 1, wherein the dispense area is within the body.

3. The gem dispenser of claim 1, wherein the shuttle is rotatable relative to the body to move the first gem from the gem storage area to the dispense area.

4. The gem dispenser of claim 3, wherein movement of the push rod relative to the body causes the shuttle to rotate relative to the body.

5. The gem dispenser of claim 1, wherein the push rod is attached to a push rod body that is movable relative to the body between first and second positions, and movement of the push rod body from the first position to the second position causes the push rod to move the first gem from the dispense area through the dispense opening.

6. The gem dispenser of claim 5, wherein movement of the push rod body from the first position to the second position causes the shuttle to move the first gem from the storage area to the dispense area.

7. The gem dispenser of claim 6, wherein movement of the push rod body from the first position to the second position causes the shuttle to rotate relative to the body.

8. The gem dispenser of claim 6, wherein the push rod body include a cam follower and the shuttle includes a cam, and wherein movement of the push rod body from the first position to the second position causes the cam follower to move along the cam and move the shuttle relative to the body.

9. The gem dispenser of claim 8, wherein the cam includes a spiral surface.

10. The gem dispenser of claim 1, further comprising a platform attached to the body and positioned such that movement of the push rod to move the first gem from the dispense area out of the dispense opening moves the first gem toward the platform.

11. The gem dispenser of claim 10, wherein the platform is movable toward the body such that the platform is movable toward the dispense opening.

12. The gem dispenser of claim 11, wherein the platform is spring biased to move away from the body.

13. The gem dispenser of claim 1, comprising an actuation button at a top of the body and movable relative to the body between first and second positions, the actuation button being operable coupled to the push rod and the shuttle such that movement of the actuation button from the first position to the second position causes the shuttle to move the first gem from the storage area to the dispense area and the push rod to move the first gem at the dispense area through the dispense opening to dispense the first gem from the body.

14. The gem dispenser of claim 13, wherein the dispense opening is at a bottom of the body, wherein the actuation button is coupled to the push rod to move the push rod downwardly relative to the body, and wherein downward movement of the push rod causes the shuttle to rotate relative to the body to move the first gem from the storage area to the dispense area.

15. The gem dispenser of claim 13, wherein the actuation button is removable from the body to expose the gem storage area for placement of the stack of gems in the gem storage area.

16. The gem dispenser of claim 15, further comprising a gem storage area cover configured to bias the stack of gems downwardly relative to the body.

17. The gem dispenser of claim 1, wherein the shuttle includes a disc with a disc opening to receive the first gem, and the shuttle is configured to rotate relative to the body about an axis that is offset from the disc opening.

18. A gem dispenser comprising:
- a body including a gem storage area configured to hold a stack of gems including first gem at a bottom of the stack, the body having a dispense opening at a dispense area at a bottom of the body;
- a shuttle configured to rotate relative to the body about a vertical axis to move the first gem from the storage area to the dispense area;
- a push rod body movable along a vertical direction relative to the body, the push rod body including a push rod configured to move the first gem at the dispense area through the dispense opening to dispense the first gem from the body; and
- an actuation button mounted at a top of the body and movable along the vertical direction relative to the body, the actuation body coupled to the push rod body such that movement of the actuation button downwardly relative to the body moves the push rod body downwardly relative to the body,
- wherein the push rod body is coupled to the shuttle such that downward movement of the push rod body relative to the body causes the shuttle to rotate to move the first gem from the storage area to the dispense area and causes the push rod to move the first gem through the dispense opening.

19. The gem dispenser of claim 18, wherein the push rod body includes a cam follower and the shuttle includes a cam, and wherein the cam follower engages the cam such that downward movement of the push rod body causes the shuttle to rotate relative to the body.

20. A method for dispensing gems, comprising:
- holding a stack of gems in a body, the stack of gems including a first gem at a bottom of the stack;
- moving the first gem along an arcuate pathway to separate the first gem from the stack of gems and position the first gem at a dispensing area; and
- pushing the first gem at the dispensing area through a dispense opening of the body to dispense the first gem from the body.

* * * * *